US00RE48255E

(19) United States
(12) Reissued Patent
Lim et al.

(10) Patent Number: US RE48,255 E
(45) Date of Reissued Patent: Oct. 13, 2020

(54) LAUNDRY TREATMENT APPARATUS

(71) Applicant: LG ELECTRONICS INC., Seoul (KR)

(72) Inventors: Jaemyung Lim, Seoul (KR); Wookjun Chung, Seoul (KR); Byeongkook Kim, Seoul (KR); Junghoi Choi, Seoul (KR)

(73) Assignee: LG ELECTRONICS INC., Seoul (KR)

(21) Appl. No.: 16/002,610

(22) Filed: Jun. 7, 2018

Related U.S. Patent Documents

Reissue of:
(64) Patent No.: 9,359,717
Issued: Jun. 7, 2016
Appl. No.: 14/559,753
Filed: Dec. 3, 2014

(30) Foreign Application Priority Data

Dec. 5, 2013 (KR) ..... 10-2013-0150441

(51) Int. Cl.
*D06F 71/36* (2006.01)
*D06F 71/29* (2006.01)
*D06F 73/02* (2006.01)
*D06F 58/10* (2006.01)

(52) U.S. Cl.
CPC ..... *D06F 71/36* (2013.01); *D06F 58/10* (2013.01); *D06F 71/29* (2013.01); *D06F 73/02* (2013.01)

(58) Field of Classification Search
CPC ..... D06F 73/00; D06F 73/02; D06F 58/10; D06F 58/12; D06F 58/14; D06F 81/06; D06F 81/08; D06F 67/005; D06C 7/00; A47K 10/48
See application file for complete search history.

(56) References Cited

U.S. PATENT DOCUMENTS 1,882,214 A 10/1932 Etten
3,117,704 A 1/1964 McMillan
3,203,122 A * 8/1965 Sweatt ..... D06F 71/34 108/35

(Continued)

FOREIGN PATENT DOCUMENTS

CN 1037557 11/1989
CN 2123546 12/1992

(Continued)

OTHER PUBLICATIONS

English translation of KR 30-0704405.*

(Continued)

*Primary Examiner* — Terrence R Till
(74) *Attorney, Agent, or Firm* — Ked & Associates, LLP

(57) ABSTRACT

The laundry treatment apparatus includes a cabinet having a receiving space for reception of laundry, a feeder configured to feed at least one of air or moisture into the receiving space, a support structure placed in the receiving space, the support structure providing a support space to allow a surface of the laundry to be supported by the support space, a guide affixed in the receiving space, the guide being configured to set a movement range of the laundry to prevent the laundry from deviating from the support space, and a press structure separably coupled to the support structure, the press structure being configured to apply pressure to the laundry positioned in the support space.

25 Claims, 4 Drawing Sheets

(56) References Cited

U.S. PATENT DOCUMENTS

| | | | | |
|---|---|---|---|---|
| 3,397,472 | A | 8/1968 | Topliffe | |
| 4,493,160 | A * | 1/1985 | Brembilla | D06F 73/02 38/1 A |
| 5,305,484 | A * | 4/1994 | Fitzpatrick | D06F 73/02 223/70 |
| 5,474,216 | A * | 12/1995 | Harrod | D06F 71/08 223/57 |
| 5,815,961 | A * | 10/1998 | Estes | D06F 73/02 223/67 |
| D597,272 | S | 7/2009 | Auguste | |
| 7,603,801 | B2 | 10/2009 | Jiang et al. | |
| 2002/0195914 | A1 | 12/2002 | Albaizar et al. | |
| 2009/0064530 | A1 | 3/2009 | Moon et al. | |
| 2009/0241269 | A1 | 10/2009 | Yoo et al. | |
| 2012/0018461 | A1 * | 1/2012 | Azizian | D06F 73/02 223/66 |
| 2013/0097896 | A1 | 4/2013 | Moon et al. | |

FOREIGN PATENT DOCUMENTS

| | | |
|---|---|---|
| CN | 2126854 | 2/1993 |
| CN | 1170061 | 1/1998 |
| CN | 1081702 | 3/2002 |
| CN | 1346921 | 5/2002 |
| CN | 1729332 | 2/2006 |
| CN | 201738157 | 2/2011 |
| CN | 104294529 | 1/2015 |
| CN | 108193464 | 7/2020 |
| DE | 2017394 | 10/1971 |
| EP | 0 253 048 | 1/1988 |
| EP | 0 324 589 | 7/1989 |
| EP | 0 816 552 | 1/1998 |
| EP | 0 816 552 A2 | 1/1998 |
| EP | 1 159 893 | 12/2001 |
| EP | 2 322 707 | 5/2011 |
| EP | 2 826 911 | 1/2015 |
| EP | 2 826 911 A1 | 1/2015 |
| EP | 2 889 426 | 7/2015 |
| JP | 47-034352 | 5/1971 |
| JP | 53-075638 | 11/1976 |
| JP | 54-181183 | 6/1978 |
| JP | S 63-82700 | 4/1988 |
| JP | H 01-274799 | 11/1989 |
| JP | H05-068795 | 3/1993 |
| JP | 10-080331 | 3/1998 |
| JP | 2000-051585 | 2/2000 |
| JP | 2002-177698 | 6/2002 |
| KR | 10-2001-0113436 | 12/2001 |
| KR | 10-0444005 | 11/2004 |
| KR | 10-2008-0078367 | 8/2008 |
| KR | 10-2011-0048344 | 11/2009 |
| KR | 10-2010-0067780 | 6/2010 |
| KR | 10-2011-0021167 | 3/2011 |
| KR | 10-2012-0078278 | 7/2012 |
| KR | 10-2012-0091799 | 8/2012 |
| KR | 10-2013-0017029 | 2/2013 |
| KR | 30-0704405 | 8/2013 |
| WO | WO 02/052087 | 7/2002 |
| WO | WO 2008/007200 | 1/2008 |
| WO | WO 2008/007200 A1 | 1/2008 |

OTHER PUBLICATIONS

English translation of KR 2001-0113436.*
European Search Report dated Nov. 21, 2014 issued in Application No. 14176862.2.
Chinese Office Action dated Dec. 3, 2015 issued in Application No. 201410340593.6.
U.S. Office Action dated Aug. 10, 2015 issued in U.S. Appl. No. 14/332,161.
Japanese Office Action dated Aug. 9, 2018 issued in JP Application No. 2017-532881.
Japanese Notice of Allowance dated Jul. 2, 2019 issued in JP Application No. 2017-532881.
Chinese Office Action dated May 5, 2016 issued in Application No. 201410736887.0.
Extended European Search Report issued in European Application No. 15201190.4 dated Apr. 22, 2016, 11 pages.
International Search Report and Written Opinion in International Application No. PCT/KR2015/014024, dated Apr. 20, 2016, 9 pages.
United States Office Action dated Feb. 24, 2017 issued in U.S. Appl. No. 14/974,050.
Korean Office Action dated Mar. 26, 2019 issued in Application No. 10-2019-0014938.
Korean Office Action dated Apr. 30, 2019 issued in Application No. 10-2013-0150441.
United States Office Action dated May 27, 2020 issued in U.S. Appl. No. 16/150,515.
Korean Notice of Allowance dated Jun. 16, 2020 issued in KR Application No. 10-2020-0021152.
United States Office Action dated Aug. 4, 2020 issued in co-pending related U.S. Appl. No. 16/150,401.
Definition of "clip" from ://www.lexico.com/definition/clip (Year: 2020).
European Search Report dated Jun. 2, 2015 issued in Application No. 14195999.9.

* cited by examiner

LAUNDRY TREATMENT APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 9,359,717, and the reissue applications are: (1) U.S. Reissue patent application Ser. No. 16/002,610 (the present application), filed on Jun. 7, 2018, which is a reissue application of U.S. patent application Ser. No. 14/559,753, filed Dec. 3, 2014, now U.S. Pat. No. 9,359,717, issued Jun. 7, 2016; and (2) U.S. Reissue patent application Ser. No. 16/129,098, filed on Sep. 12, 2018, which is a continuation reissue application of U.S. Reissue patent application Ser. No. 16/002,610.*

CROSS-REFERENCE TO RELATED APPLICATION

This application *is a Reissue of U.S. Pat. No. 9,359,717, which* claims priority under 35 U.S.C. §119 to Korean Application No. 10-2013-0150441 filed on Dec. 5, 2013, whose entire disclosure is hereby incorporated by reference.

BACKGROUND

1. Field

The present disclosure relates to laundry treatment apparatuses.

2. Background

Generally, laundry treatment apparatuses refer to apparatuses that perform a variety of operations related to laundry (washing, drying, deodorization, wrinkle removal, and the like). Examples of laundry treatment apparatuses include washing machines that wash laundry, drying machines that dry wet laundry, and refreshers for deodorization and removal of wrinkles of laundry.

In recent years, laundry treatment apparatuses have been developed to allow a single apparatus to perform all of washing, drying, deodorization, and removal of wrinkles. However, these laundry treatment apparatuses, which include a drum in which laundry is received and a drive device to rotate the drum, do not provide satisfactory deodorization and removal of wrinkles.

Most laundry treatment apparatuses have limits on deodorization or removal of wrinkles because they generally perform deodorization or removal of wrinkles during rotation of a drum and laundry introduced into the drum is not spread, but wrinkled.

In addition, most laundry treatment apparatuses have no means to put a crease in laundry (e.g., the straight line in the front and back of trousers), which causes a user to inconveniently use a crease making means, such as an iron, after completion of washing or drying when desired to put a crease in laundry.

BRIEF DESCRIPTION OF THE DRAWINGS

The embodiments will be described in detail with reference to the following drawings in which like reference numerals refer to like elements wherein.

DETAILED DESCRIPTION DISCLOSURE

Figure 1:
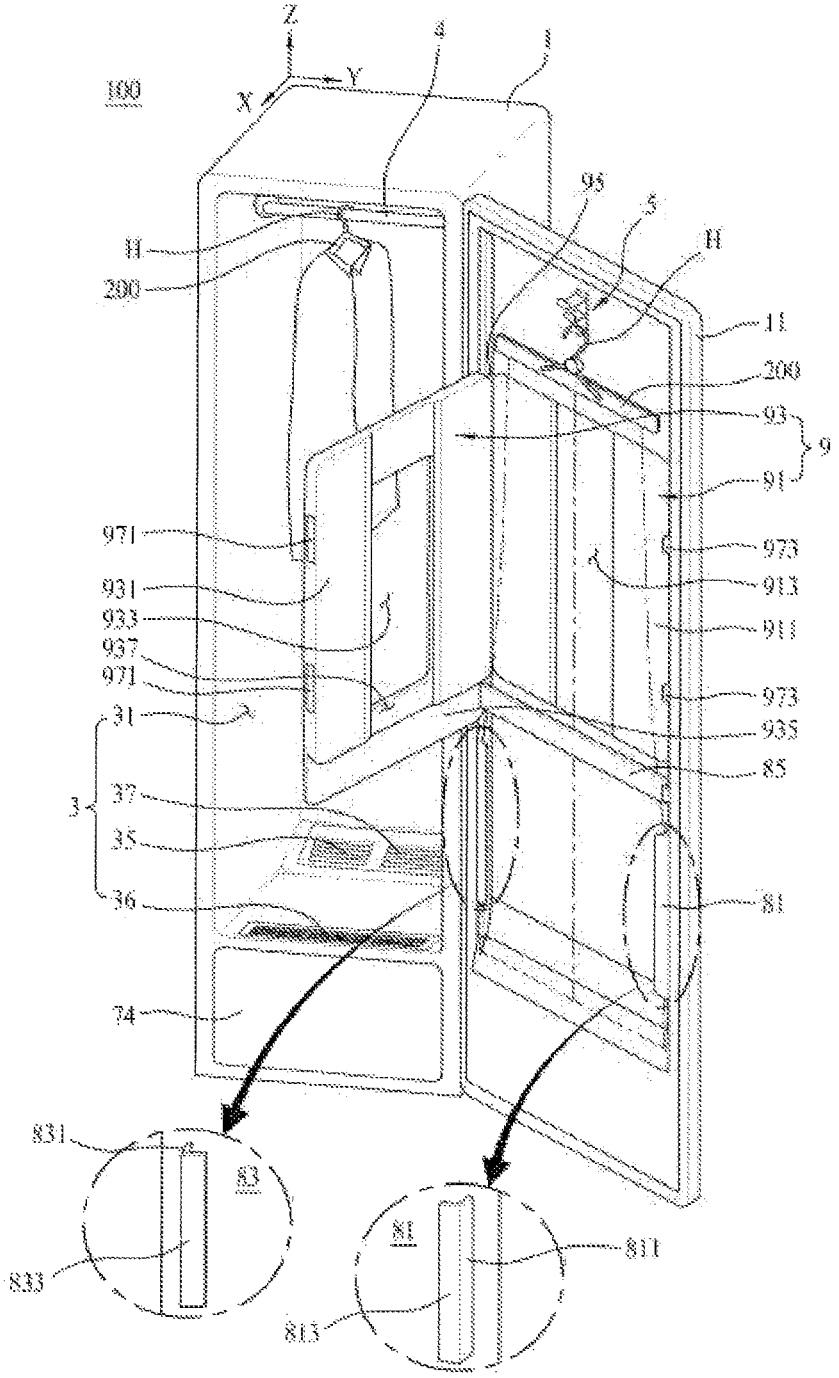
FIG. 1 is a view showing one example of a laundry treatment apparatus according to the present disclosure.

As shown in FIG. 1, a laundry treatment apparatus according to the present disclosure, designated by reference numeral 100, includes a cabinet 1 defining an external appearance of the laundry treatment apparatus 100, a laundry receiver 3 defined within the cabinet 1 to provide a laundry receiving space, a feeder to feed at least one of air or moisture to the laundry receiver 3, and a presser 9 placed within the laundry receiver 3, the presser 9 serving to smooth out the wrinkles in laundry or to put a crease in laundry (e.g., the straight line in the front and back of trousers).

The laundry receiver 3 includes a receiving space 31 in which laundry is received, the receiving space 31 being defined within the cabinet 1. The receiving space 31 is opened or closed by a door 11 coupled to the cabinet 1.

The cabinet 1 may accommodate laundry support members configured to support laundry. The laundry support members may include a first laundry support member 4 installed in the receiving space 31 and a second laundry support member 5 affixed to the door 11.

The first laundry support member 4 may take the form of a bar that extends in the width direction of the receiving space 31 (i.e. in a width direction of the door 11 or along the Y-axis) or in the depth direction of the receiving space 31 (i.e. along the X-axis). FIG. 1 shows the case in which the first laundry support member 4 extends in the width direction of the receiving space 31 by way of example.

In this case, laundry may be supported by the first laundry support member 4 via a hook H of a hanger 200 or without the hanger 200. In either case, laundry may be kept spread within the receiving space 31.

The second laundry support member 5 is affixed to the door 11 to allow laundry to be placed within the receiving space 31 while being kept spread. More specifically, the second laundry support member 5, as exemplarily shown in FIG. 2, may include a base 54 affixed to the door 11, and two or more support pieces or hooks 51, 52 and 53 protruding from the base 54 and arranged in the height direction of the door 11 (i.e. along the Z-axis).

The support pieces of the second laundry support member 5 may include a first support piece 53, a second support piece 52 that is located above the first support piece 53 and has a greater length than a length of the first support piece 53, and a third support piece 51 that is located above the second support piece 52 and has a greater length than a length of the second support piece 52.

The reason why length of the support pieces increases from the first support piece 53 to the third support piece 51 is to allow the second laundry support member 5 to support a number of laundries. As laundry is hung on hangers 200 and hooks H of the hangers 200 are supported by the respective support pieces 51, 52 and 53, the laundry is kept spread within the receiving space 31.

Meanwhile, the cabinet 1 may further include a machine room 7 isolated from the receiving space 31. In this case, the feeder may be mounted in the machine room 7.

Figure 2:
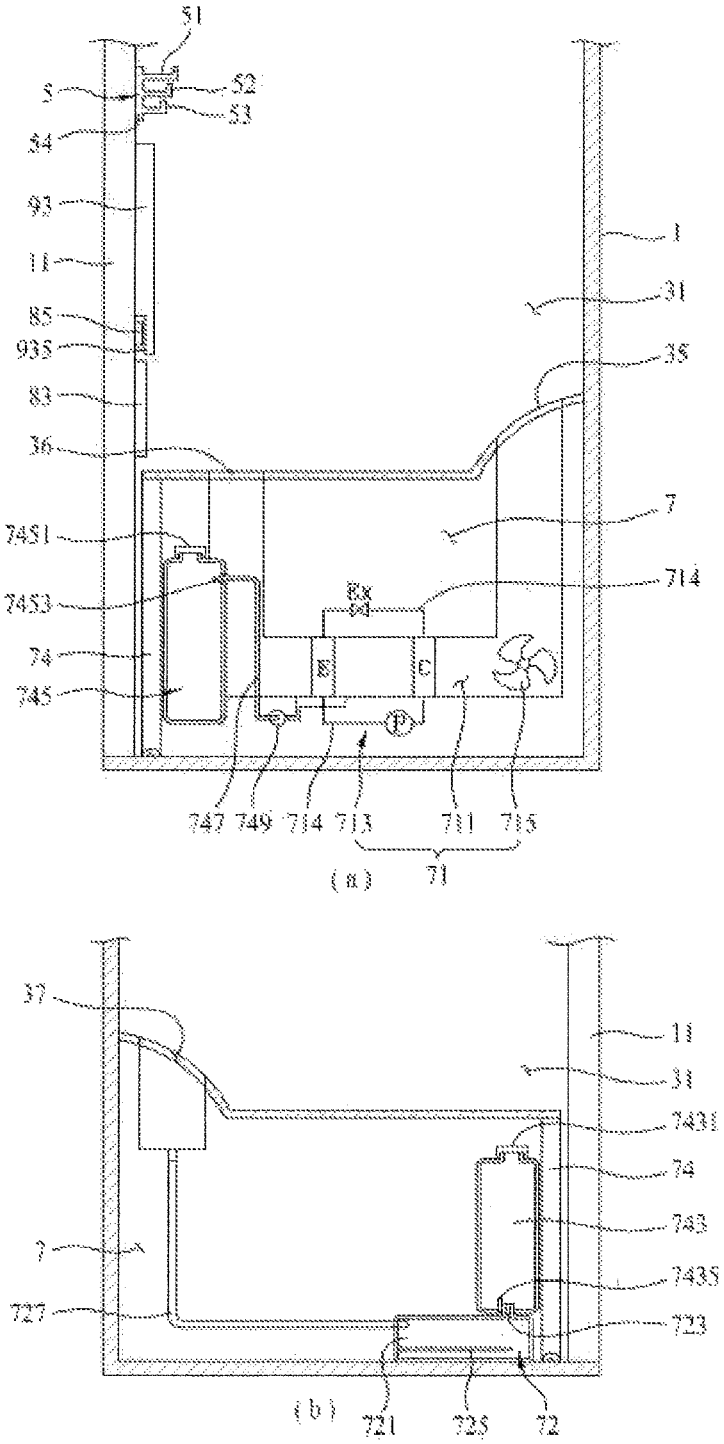
FIG. 2 is a sectional view of the laundry treatment apparatus according to the present disclosure.

As exemplarily shown in FIG. 2, the machine room 7 may be located under the receiving space 31 and may be opened and closed by a machine room door 74.

When air fed into the receiving space 31 by the feeder is heated air and moisture fed into the receiving space 31 by the feeder is steam, positioning the machine room 7 under the receiving space 31 ensures that the heated air or steam is evenly fed into the receiving space 31 without a separate blowing device.

The feeder may include at least one of an air feeder 71 that feeds air (heated air or unheated air) into the receiving space 31 and a moisture feeder 72 that feeds moisture (steam or mist) into the receiving space 31.

Hereinafter, for convenience of description, it is assumed that the feeder includes both the air feeder 71 and the moisture feeder 72, the air feeder 71 feeds hot air into the receiving space 31, and the moisture feeder 72 feeds steam into the receiving space 31.

The air feeder 71 may include a circulation duct 711 for circulation of interior air of the receiving space 31, a heat exchanger 713 for heat exchange with air moving through the circulation duct 711, and a blower 715 for movement of interior air of the receiving space 31 through the circulation duct 711.

The circulation duct 711 communicates with the interior of the receiving space 31 through an air discharge port 35 and an air suction port 36 of the receiving space 31.

The air discharge port 35 and the air suction port 36 are perforated in the bottom of the receiving space 31 to enable communication between the receiving space 31 and the machine room 7. As such, when the circulation duct 711 mounted in the machine room 7 is connected at one end thereof to the air suction port 36 and at the other end thereof to the air discharge port 35, the circulation duct 711 may communicate with the interior of the receiving space 31.

The heat exchanger 713 serves to dehumidify and heat air introduced unto the circulation duct 711. FIG. 2 shows a heat pump as one example of the heat exchanger.

When the heat exchanger 713 takes the form of a heat pump, the heat exchanger 713 may include an evaporator E located within the circulation duct 711, a condenser C located within the circulation duct 711, a compressor P located at the outside of the circulation duct 711, and an expander Ex located at the outside of the circulation duct 711.

The evaporator E, the compressor P, the condenser C, and the expander Ex are connected to one another via refrigerant tubes 714.

The compressor P serves to compress refrigerant to high pressure to allow the refrigerant to be circulated through the refrigerant tubes 714. The evaporator E serves to evaporate the refrigerant by absorbing heat from air within the circulation duct 711. The condenser C serves to condense the refrigerant by discharging heat to the air within the circulation duct 711.

The blower 715 is located within the circulation duct 711 and serves to cause circulation of the interior air of the receiving space 31 through the circulation duct 711. The blower 715 is located between the condenser C and the air discharge port 35.

Accordingly, when the blower 715 is operated, the air within the circulation duct 711 moves into the receiving space 31 through the air discharge port 35, and the interior air of the receiving space 31 moves into the circulation duct 711 through the air suction port 36.

The air introduced into the circulation duct 711 through the air suction port 36 is cooled while passing through the evaporator E and, in turn, the air having passed through the evaporator E is heated while passing through the condenser C.

When the air is cooled while passing through the evaporator E, moisture contained in the air is removed (dehumidification), and the moisture removed from the air (condensate water) remains on a surface of the evaporator E or within the circulation duct 711.

Since the resultant condensate water remaining in the circulation duct 711 causes deterioration in the heat exchange efficiency of the heat exchanger 713, according to the present disclosure, a drain unit may be further provided to remove the condensate water generated by the evaporator E.

The drain unit may include a drain tank 745 separably coupled to the machine room door 74, and a drainpipe 747 and a drain pump 749 which serve to direct the condensate water from the circulation duct 711 to the drain tank 745.

The drain tank 745 may have any shape so long as it can provide a space for storage of liquid. Preferably, the drain tank 745 may include a drain tank lid 7451 for discharge of liquid stored in the drain tank 745 and an inlet hole 7453 for separable connection of the drainpipe 747.

The inlet hole 7453 may be provided with a check valve (not shown). This serves to allow the drainpipe 747 to be separated from the inlet hole 7453 when the machine room door 74 opens the machine room 7 and to allow the drainpipe 747 to be inserted into the inlet hole 7453 when the machine room door 74 closes the machine room 7 (in addition to preventing leakage of water out of the drain tank 745 when the drain tank 745 is separated from the machine room door 74).

Meanwhile, as shown in FIG. 2(b), the moisture feeder 72 may include a reservoir 721 placed in the machine room 7, a heater 725 mounted in the reservoir 721, and a moisture feed pipe 727 to connect the reservoir 721 to a moisture discharge port 37.

The reservoir 721 serves to store water therein. The heater 725 serves to heat the water stored in the reservoir 721 to change the water into steam. The moisture feed pipe 721 serves to guide steam from the reservoir 721 to the receiving space 31.

Accordingly, the heater 725 is preferably located proximate to the bottom of the reservoir 721, and the moisture feed pipe 727 is preferably located at the top (or an upper end) of the reservoir 721.

The reservoir 721 receives water via a water supply unit. The water supply unit may include a water supply tank 743 separably coupled to the machine room door 74.

In this case, the reservoir 721 may be provided with a connection pipe 723 that is connected to the water supply tank 743 when the machine room door 7 closes the machine room 7 and is separated from the water supply tank 743 when the machine room door 7 opens the machine room 7.

While the water supply tank 743 may have any shape so long as it can store liquid therein, preferably, the water supply tank 743 may include a water supply tank lid 7431 for supply of liquid into the water supply tank 743, a discharge hole (not shown) for insertion of the connection pipe 723, and a check valve 7435 provided at the discharge hole.

The reason why the water supply tank 743 is separably coupled to the machine room door 74 is that the laundry treatment apparatus 100 according to the present disclosure is installed at a position distant from a water supply source (not shown).

That is, when the laundry treatment apparatus 100 is located proximate to a water supply source, the reservoir 721 may be controlled to receive water from the water supply source as needed. However, this control is impossible when the laundry treatment apparatus 100 is installed at a position distant from the water supply source. The water supply tank 743 serves to solve this problem.

Accordingly, differently from previous laundry treatment apparatuses that perform deodorization or removal of wrinkles by supplying hot air or steam into a drum during rotation of the drum, the laundry treatment apparatus 100 according to the present disclosure is configured to feed hot air or steam while keeping laundry spread within the receiving space 31, thereby preventing the laundry from being wrinkled after steam or hot air is fed thereto.

Meanwhile, the presser (see reference numeral 9) shown in FIG. 1 serves to remove wrinkles of laundry or to put a crease in laundry (e.g., the straight line in the front and back of trousers) using steam and hot air fed into the receiving space 31.

The presser 9, which is configured to direct at least one of steam and hot air fed into the receiving space 31 to laundry, may be located at any position within the receiving space 31. FIG. 1 shows the case in which the presser 9 is affixed to an inner surface of the door 11 (i.e. a surface of the door 11 defining one side of the receiving space 31) by way of example.

The presser 9 according to the present disclosure may include a support structure 91 formed in the inner surface of the door 11 to provide a laundry support space, and a press structure 93 rotatably coupled to the support structure 91 or the door 11, the press structure 93 serving to apply pressure to laundry placed in the support structure 91.

The support structure 91 may be a surface of the door 11 facing the receiving space 31, or may be a separate member affixed to the surface of the door 11. FIG. 1 shows the case in which the support structure 91 includes a support body 911 affixed to the surface of the door 11 by way of example.

In this case, the support body 911 may have a plane parallel to the surface of the door 11.

The press structure 93 may include a press body 931 separably coupled to the inner surface of the door 11 or the support body 911, and a body through-hole 933 perforated in the press body 931 to direct steam or hot air introduced into the receiving space 31 to laundry supported by the support body 911.

That the press body 931 is separably coupled to the inner surface of the door 11 or the support body 911 means that one end of the press body 931 is rotatably coupled to the door 11 or the support body 911 and the other end (free end) of the press body 931 is separably coupled to the door 11 or the support body 911.

In addition, that the press body 931 is separably coupled to the inner surface of the door 11 or the support body 911 means that the press body 931 is completely separable from the door 11 or the support body 911 without any connection therebetween.

FIG. 1 shows the case in which the press body 931 is secured to the door 11 via a hinge 95 mounted to the inner surface of the door 11 by way of example. The press body 931 is separably coupled to the inner surface of the door 11 via a coupling mechanism 971 and 973.

The coupling mechanism may include a separable coupling recess 971 formed in one of the door 11 and the press body 931 and a coupling protrusion 973 formed at the other one of the door 11 and the press body 931 so as to be engaged with the separable coupling recess 971.

Accordingly, as the user hangs the hook H of the hanger 200 on the second laundry support member 5, laundry such as trousers may be supported by a surface of the support body 911 while being kept spread.

Once laundry is supported by the surface of the support body 911, the user may pivotally rotate the press body 931 toward the support body 911 to couple the press body 931 and the support body 911 to each other via the coupling mechanism 971 and 973.

When the air feeder 71 or the moisture feeder 72 feeds hot air or steam into the receiving space 31 while the laundry is kept pressed between the support body 911 and the press body 931, the hot air or steam within the receiving space 31 is fed to the laundry through the body through-hole 933.

Accordingly, the laundry treatment apparatus 100 of the present disclosure has the effects of removing wrinkles from laundry and of putting a crease in laundry (e.g., the straight line in the front and back of trousers).

Meanwhile, in the case of laundry such as trousers, there exists a sewing line that may cause the presser 9 having the above-described configuration to put an unnecessary crease in the laundry.

To solve this problem, the presser 9 may further include grooves 913 and 937 formed in any one of the support body 911 and the press body 931 to prevent a specific region of laundry such as a sewing line from being pressed.

FIG. 1 shows the case in which the support body 911 includes a support body groove 913 and the press body 931 includes a press body groove 937 by way of example.

The support body groove 913 may be recessed in a surface of the support body 911 to extend in the height direction of the door 11 (i.e. along the Z-axis). That is, the support body groove 913 may be recessed to cause the surface of the support body 911 to be far away from the receiving space 31.

Likewise, the press body groove 937 may be recessed in a surface of the press body 931 to extend in the height direction of the door 11 (i.e. along the Z-axis), thus causing the surface of the press body 931 to be far away from the support body 911 (to be closer to the receiving space 31).

Accordingly, in the present disclosure, when the press body 931 and the support body 911 are coupled to each other, the support body groove 913 and the press body groove 937 may be aligned with each other to define a space in a longitudinal direction of laundry (parallel to the height direction of the door 11) in which no pressure is applied to a specific region of laundry such as a sewing line.

It should be noted, differently from the above description, that the present disclosure may employ only one of the support body groove 913 and the press body groove 937.

In addition, the support body groove 913 may be located at the center of the support body 911 and the press body groove 937 may be located at the center of the press body 913.

In use of the presser 9 having the above-described configuration, the user must position a sewing line of laundry in the support body groove 913 or in the press body groove 937 and thereafter must pivotally rotate the press body 931 toward the support body 911 so as to fix the laundry. Thus, there is a risk of the sewing line being deviated from the support body groove 913 or the press body groove 937 when the laundry is unintentionally displaced while the press body 931 is coupled to the support body 911.

To solve the above-described problem, the laundry treatment apparatus 100 according to the present disclosure may further include a guide 8 to prevent laundry from deviating from a support space (i.e. a space provided by the support body 911) and a fixing member 85 (*or clamp*) to fix laundry in the support space.

The fixing member 85 is separably coupled to the door 11 and has one end rotatably secured to the surface of the door 11. The guides 8 protrude from the surface of the door 11 to provide a space for reception of laundry.

Figure 3:
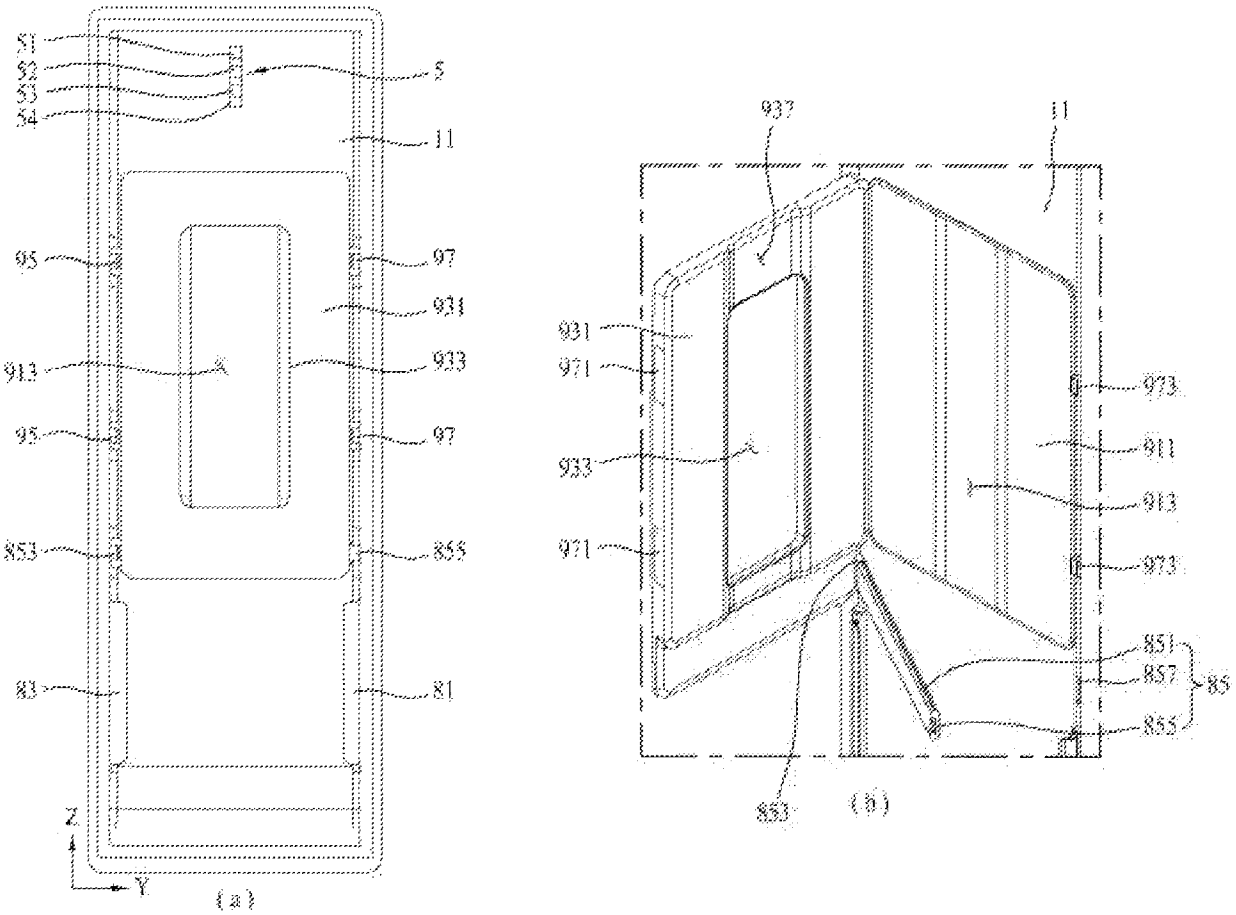
FIG. 3 is a view showing a presser included in the laundry treatment apparatus according to the present disclosure.

The fixing member 85 and the guide 8 may be located at any positions of the surface of the door 11 so long as they do not interfere with rotation of the press body 931. FIG. 3 shows the case in which the fixing member 85 is located under the support body 911 and the guide 8 is located under the fixing member 85 by way of example.

As exemplarily shown in FIG. 1, the guide 8 may include a first guide 81 and a second guide 83 respectively located at facing ends of the door 11.

The first guide 81 may include a first fixing plate 811 protruding from the surface of the door 11 and a first extension plate 813 extending from the first fixing plate 811 toward the second guide 83. The second guide 83 may include a second fixing plate 831 protruding from the surface of the door 11 and a second extension plate 833 extending from the second fixing plate 831 toward the first guide 81.

A distance between the first fixing plate 811 and the second fixing plate 831 may be equal to a width of the support body 911 (i.e. a length of the support body 911 along the Y-axis).

Accordingly, a free end of laundry supported by the second laundry support member 5 via the hook H of the hanger 200 is restricted in terms of movement along the Y-axis by the first fixing plate 811 and the second fixing plate 831 and restricted in terms of movement along the X-axis by the first extension plate 813 and the second extension plate 833.

The first extension plate 813 of the first guide 81 is extendable in length toward the second extension plate 833 and the second extension plate 833 of the second guide 83 is extendable in length toward the first extension plate 813.

This serves to prevent movement of laundry along the X-axis by adjusting lengths of the respective extension plates 813 and 833 according to a width of the laundry.

As exemplarily shown in FIG. 3, the fixing member 85 may include a fixing body 851 in the form of a bar or board and a fixing body hinge 853 to rotatably secure the fixing body 851 to the inner surface of the door 11.

The fixing member 85 may be separably coupled to the door 11 via a fixing body coupling mechanism.

The fixing body coupling mechanism may include a hook 855 formed at any one of the fixing body 851 and the door 11, and a hook coupling recess 857 formed in the other one of the fixing body 851 and the door 11 to allow the hook 855 to be separably inserted thereinto.

Accordingly, the present disclosure allows the user to fix a position of laundry via the fixing member 85 after positioning a sewing line of the laundry in the support body groove 913. This may minimize deviation possibility of the sewing line of the laundry from the support body groove 913 while the press body 931 is coupled to the support body 911.

Meanwhile, the fixing member 85 may be installed so as not to be exposed out of the press body 931. To this end, the press body 931 may further include a fixing member receiving groove 935 in which the fixing member 85 is received.

Preventing the fixing member 85 from being exposed out of the press body 931 serves to prevent deterioration in the aesthetics of the interior of the receiving space 31 when the door 11 opens the receiving space 31.

Figure 4:
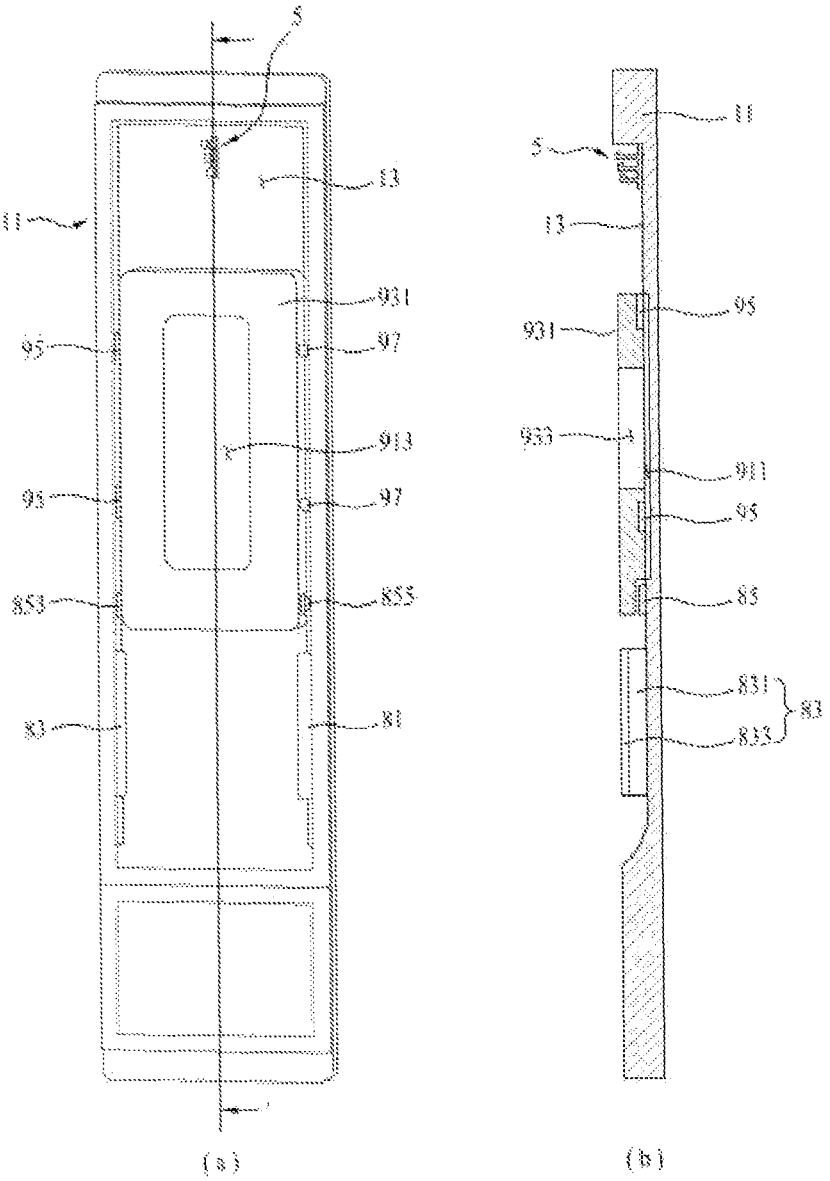
FIG. 4 is a view showing another embodiment of the presser.

FIG. 4 shows another embodiment of the laundry treatment apparatus according to the present disclosure. The present embodiment has a feature that a presser receiving recess 13 is formed in the surface of the door 11.

The presser receiving recess 13 is recessed to cause the surface of the door 11 to be far away from the receiving space 31. As such, the support structure 91, the press structure 93, the fixing member 85, and the guide 8, which constitute the presser 9, are received in the presser receiving recess 13.

Accordingly, the present embodiment has the effects of reducing a weight of the door 11 by positioning the presser 9 in an inner space of the door 11 and minimizing a volume of the door 11.

Moreover, the surface of the press body 931 included in the presser 9 may be parallel to the surface of the door 11 where the press receiving recess 13 is not formed.

As is apparent from the above description, the present disclosure has the effect of providing laundry treatment apparatuses having a crease making means.

In addition, the present disclosure has the effect of providing laundry treatment apparatuses which provide easy drying, deodorization, removal of wrinkles, and sterilization of laundry.

Accordingly, the present disclosure is directed to laundry treatment apparatuses that substantially obviate one or more problems due to limitations and disadvantages of the related art.

One object of the present disclosure is to provide laundry treatment apparatuses having a crease making means.

Another object of the present disclosure is to provide laundry treatment apparatuses which provide easy drying, deodorization, removal of wrinkles, and sterilization of laundry.

Additional advantages, objects, and features will be set forth in part in the description which follows and in part will become apparent to those having ordinary skill in the art upon examination of the following or may be learned from practice. The objectives and other advantages may be realized and attained by the structure particularly pointed out in the written description and claims hereof as well as the appended drawings.

To achieve these objects and other advantages and in accordance with the purpose of the disclosure, as embodied and broadly described herein, in accordance with one aspect of the present disclosure, a laundry treatment apparatus includes a cabinet having a receiving space for reception of laundry, a feeder configured to feed at least one of air or moisture into the receiving space, a support structure placed in the receiving space, the support structure providing a support space to allow a surface of the laundry to be supported by the support space, a guide affixed in the receiving space, the guide being configured to set a movement range of the laundry to prevent the laundry from deviating from the support space, and a press structure separably coupled to the support structure, the press structure being configured to apply pressure to the laundry positioned in the support space.

The laundry treatment apparatus according to the present disclosure may further include a fixing member separably coupled in the receiving space, the fixing member being configured to fix a position of the laundry supported in the support space.

The support structure and the guide may be affixed to an inner circumferential surface of the receiving space, and the press structure and the fixing member may be rotatably coupled to the inner circumferential surface of the receiving space.

The laundry treatment apparatus according to the present disclosure may further include a door rotatably coupled to the cabinet to open or close the receiving space, the support structure and the guide may be affixed to an inner surface of the door facing the receiving space, and the press structure and the fixing member may be rotatably coupled to the inner surface of the door.

The inner surface of the door may be provided with a presser receiving recess, the presser receiving recess being recessed to cause the inner surface of the door to be far away from the receiving space, and the support structure, the press structure, the fixing member and the guide may be received in the presser receiving recess.

The support structure may include a support body providing the support space, and the press structure may include a press body separably coupled to the support body to apply pressure to the laundry, the press body being rotatably coupled to the inner surface of the door, and a body through-hole perforated in the press body for communication between the receiving space and the support structure.

The support body may be configured to form a plane parallel to the inner surface of the door.

At least one of the press body and the support body may have a groove configured to define a space for non-application of pressure to the laundry.

The support structure may further include a support body groove formed in a height direction of the door, the support body groove being recessed to cause a surface of the support body to be far away from the receiving space.

The press structure may further include a press body groove recessed in a surface of the press body, the press body groove being aligned with the support body groove to define a space for non-application of pressure to the laundry.

The fixing member may be located under the support body, and the press structure may further include a fixing member receiving groove formed in the press body for reception of the fixing member.

The guide may be located under the fixing member so as not to interfere with rotation of the press body.

The guide may include a first guide configured to receive one end of the laundry parallel to a height direction of the door and a second guide configured to receive the other end of the laundry parallel to the height direction of the door.

The first guide may include a first fixing plate protruding from the inner surface of the door, and a first extension plate extending from the first fixing plate toward the second guide to define a space for reception of one end of the laundry, and the second guide may include a second fixing plate protruding from the inner surface of the door, and a second extension plate extending from the second fixing plate toward the first guide to define a space for reception of the other end of the laundry.

The laundry treatment apparatus according to the present disclosure may further include a laundry support member affixed to the inner surface of the door at a position above the support structure, one end of the laundry being secured to the laundry support member.

It is to be understood that both the foregoing general description and the following detailed description of the present disclosure are exemplary and explanatory and are intended to provide further explanation of the present disclosure as claimed.

A laundry treatment apparatus comprises: a cabinet having a space configured to receive laundry; a feeder configured to feed at least one of air or moisture into the space; and a press to flatten the laundry, wherein the press includes: a support having an area to support a surface of the laundry; a guide configured to limit a movement range of the laundry from deviating from the support area; and a plate structure separably coupled to the support, the plate structure being configured to apply pressure to the surface of the laundry positioned in the support area.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treatment apparatus comprising:

a cabinet having a space [configured] to receive laundry;

a door rotatably coupled to the cabinet to open or close the space;

a feeder configured to feed at least one of air or moisture into the space; and a press to flatten the laundry, wherein the press includes:

a support [having an area to support] *that supports* a surface of the laundry;

a guide configured to limit a movement range of the laundry [from deviating from] *relative to* the support[area]; and a plate structure [separably] coupled to [the support] *the door*, the plate structure being configured to apply pressure to the surface of the laundry positioned [in] *on* the support[area], wherein the guide *is positioned below the plate structure and* restricts the laundry's movement in a direction parallel to a bottom of the cabinet.

2. The apparatus according to claim 1, further including a clamp to fix a position of the laundry supported [in] *on* the support[area].

3. The apparatus according to claim 2, wherein the support and the guide are affixed to an inner [circumferential] surface of the receiving space, and the plate structure and the clamp are rotatably coupled to the inner [circumferential] surface of the receiving space.

4. The apparatus according to claim 2, wherein the support and the guide are affixed to an inner surface of the door facing the receiving space, and the plate structure and the clamp are rotatably coupled to the inner surface of the door.

5. The apparatus according to claim 4, wherein the inner surface of the door is provided with a recess, and wherein the support, the plate structure, the clamp and the guide are positioned in the recess.

6. The apparatus according to claim 4, wherein the support structure includes a support body[providing the support area], and the plate structure includes a press body *configured to be* separably coupled [to] *with* the support body to apply pressure to the laundry, the press body being rotatably coupled to the inner surface of the door, and a body through-hole [perforated] *provided* in the press body.

7. The apparatus according to claim 6, wherein the support body is configured to form a plane parallel to the inner surface of the door.

8. The apparatus according to claim 6, wherein at least one of the press body or the support body has a groove configured to define a space for non-application of pressure to the laundry.

9. The apparatus according to claim 6, wherein the support further includes a support body groove formed in a height direction of the door, the support body groove being recessed to cause a surface of the support body to be further away from the receiving space.

10. The apparatus according to claim 9, wherein the plate structure further includes a press body groove recessed in a surface of the press body, the press body groove being aligned with the support body groove to define a space for non-application of pressure to the laundry.

11. The apparatus according to claim 6, wherein the clamp is located under the support body, and the plate structure further includes a fixing member receiving groove formed in the press body for covering the clamp.

12. The apparatus according to claim 11, wherein the guide is located under the clamp for non-interfere with rotation of the press body.

13. The apparatus according to claim 12, wherein the guide includes:

a first guide configured to receive one end of the laundry parallel to a height direction of the door, and a second guide configured to receive the other end of the laundry parallel to the height direction of the door.

14. The apparatus according to claim 13, wherein the first guide includes a first fixing plate protruding from the inner surface of the door, and a first extension plate extending from the first fixing plate toward the second guide to define a space for reception of one end of the laundry, and the second guide includes a second fixing plate protruding from the inner surface of the door, and a second extension plate extending from the second fixing plate toward the first guide to define a space for reception of the other end of the laundry.

15. The apparatus according to claim 4, further comprising a laundry support member or *a* hook affixed to the inner surface of the door at a position above the press, one end of the laundry being secured to the laundry support member or the hook.

*16. A laundry treatment apparatus comprising:*

*a cabinet having a space to receive laundry;*

*a door rotatably coupled to the cabinet to open or close the space;*

*a feeder configured to feed at least one of air or moisture into the space; and*

*a press to flatten the laundry, wherein the press includes:*

*a support that is affixed to an inner surface of the receiving space to support a surface of the laundry;*

*a guide that is affixed to the inner surface of the receiving space and configured to limit a movement range of the laundry relative to the support; and*

*a plate structure configured to apply pressure to the surface of the laundry positioned on the support,*

*wherein the guide is positioned below the plate structure and restricts the laundry's movement in at least one of a width direction or a depth direction of the cabinet.*

*17. The apparatus according to claim 16, further comprising a hinge to rotatably couple the plate structure to the support.*

*18. The apparatus according to claim 16, further comprising a hinge to rotatably couple the plate structure to the inner surface of the door on which the support is mounted.*

*19. A laundry treatment apparatus comprising:*

*a cabinet having a space to receive laundry;*

*a door rotatably coupled to the cabinet to open or close the space;*

*a feeder configured to feed at least one of air or moisture into the space; and*

*a press to flatten the laundry, wherein the press includes:*

*a support that is affixed to an inner surface of the door facing the receiving space to support a surface of the laundry;*

*a guide affixed to the inner surface of the door and configured to limit a movement range of the laundry relative to the support; and*

*a plate structure configured to apply pressure to the surface of the laundry positioned on the support,*

*wherein the guide is positioned below the plate structure and restricts the laundry's movement in a lateral direction of the door.*

*20. The apparatus according to claim 19, further comprising a hinge to rotatably couple the plate structure to the support.*

*21. The apparatus according to claim 19, further comprising a hinge to rotatably couple the plate structure to the inner surface of the door.*

*22. The apparatus according to claim 19, wherein the inner surface of the door is provided with a recess, and wherein at least one of the support, the plate structure, or the guide is positioned in the recess.*

*23. The apparatus according to claim 19, wherein the support structure includes a support body, and the plate structure includes a press body configured to be separably coupled with the support to apply pressure to the laundry, and a body through-hole provided in the press body.*

*24. The apparatus according to claim 23, wherein at least one of the press body or the support body has a groove configured to define a space in which the laundry is not pressed.*

*25. The apparatus according to claim 19, wherein the guide includes:*

*a first guide configured to receive one end of the laundry parallel to a direction corresponding to a height of the door, and*

*a second guide configured to receive another end of the laundry parallel to the direction corresponding to the height of the door.*

* * * * *